United States Patent
Ma et al.

(10) Patent No.: US 10,803,619 B2
(45) Date of Patent: Oct. 13, 2020

(54) METHOD AND SYSTEM FOR EFFICIENTLY MINING DATASET ESSENTIALS WITH BOOTSTRAPPING STRATEGY IN 6DOF POSE ESTIMATE OF 3D OBJECTS

(71) Applicant: Siemens Mobility GmbH, Munich (DE)

(72) Inventors: Kai Ma, Princeton, NJ (US); Shanhui Sun, Princeton, NJ (US); Stefan Kluckner, Berlin (DE); Ziyan Wu, Princeton, NJ (US); Terrence Chen, Princeton, NJ (US); Jan Ernst, Plainsboro, NJ (US)

(73) Assignee: Siemens Mobility GmbH, Munich (DE)

( * ) Notice: Subject to any disclaimer, the term of this patent is extended or adjusted under 35 U.S.C. 154(b) by 126 days.

(21) Appl. No.: 16/084,572

(22) PCT Filed: Mar. 13, 2017

(86) PCT No.: PCT/US2017/022035
§ 371 (c)(1),
(2) Date: Sep. 13, 2018

(87) PCT Pub. No.: WO2017/160688
PCT Pub. Date: Sep. 21, 2017

(65) Prior Publication Data
US 2019/0080475 A1    Mar. 14, 2019

Related U.S. Application Data

(60) Provisional application No. 62/307,883, filed on Mar. 14, 2016.

(51) Int. Cl.
*G06T 7/77*     (2017.01)
*G06N 3/08*     (2006.01)
(Continued)

(52) U.S. Cl.
CPC ............... *G06T 7/77* (2017.01); *G06F 17/18* (2013.01); *G06N 3/08* (2013.01); *G06N 3/0454* (2013.01);
(Continued)

(58) Field of Classification Search
CPC .. G06K 9/6256; G06K 9/6267; G06K 9/6277; G06K 9/46; G06K 9/00201;
(Continued)

(56) References Cited

U.S. PATENT DOCUMENTS 6,298,351 B1 * 10/2001 Castelli ................ G06K 9/0063
8,429,168 B1    4/2013 Chechik et al.
(Continued)

OTHER PUBLICATIONS

International Search Report dated Jun. 9, 2017; PCT Application No. PCT/USZ017/022035; Filing Date: Mar. 13, 2017; 13 pages.
(Continued)

*Primary Examiner* — Dung Hong

(57) ABSTRACT

A method for identifying a feature in a first image comprises establishing an initial database of image triplets, and in a pose estimation processor, training a deep learning neural network using the initial database of image triplets, calculating a pose for the first image using the deep learning neural network, comparing the calculated pose to a validation database populated with images data to identify an error case in the deep learning neural network, creating a new set of training data including a plurality of error cases identified in a plurality of input images and retraining the deep learning neural network using the new set of training data. The deep learning neural network may be iteratively retrained with a series of new training data sets. Statistical analysis is performed on a plurality of error cases to select a subset of the error cases included in the new set of training data.

16 Claims, 4 Drawing Sheets

(51) Int. Cl.
*G06F 17/18* (2006.01)
*G06N 3/04* (2006.01)
(52) U.S. Cl.
CPC ............... *G06T 2207/20081* (2013.01); *G06T 2207/20084* (2013.01); *G06T 2207/30244* (2013.01)
(58) Field of Classification Search
CPC ........ G06N 20/00; G06N 3/0454; G06N 3/08; G06F 16/48
See application file for complete search history.

(56) References Cited

U.S. PATENT DOCUMENTS

| | | | | |
|---|---|---|---|---|
| 2006/0088207 | A1* | 4/2006 | Schneiderman | G06K 9/6296 382/159 |
| 2008/0108510 | A1* | 5/2008 | Thayer | G16B 25/00 506/8 |
| 2009/0248545 | A1* | 10/2009 | Robinson | G06Q 10/06 705/26.1 |
| 2015/0196102 | A1 | 7/2015 | Moreau | |
| 2017/0124692 | A1* | 5/2017 | Yoshida | G06T 3/60 |
| 2017/0193296 | A1* | 7/2017 | Duong | G06K 9/00335 |
| 2019/0130603 | A1* | 5/2019 | Sun | G06K 9/00208 |
| 2019/0361994 | A1* | 11/2019 | Shen | G06F 16/583 |

OTHER PUBLICATIONS

Benjamin Planche et al: "DepthSynth: Real-Time Realistic Synthetic Data Generation from CAD Models for 2.50 Recognition", Feb. 27, 2017 (Feb. 27, 2017). XP055366521.
Wohlhart Paul et al: "Learning descriptors for object recognition and 3D pose estimation". 2015 IEEE Conference on Computer Vision and Pattern Recognition (CVPR). IEEE. Jun. 7, 2015 (Jun. 7, 2015) • pp. 3109-3118. XP032793759. / Jun. 7, 2015.
Jiang Wang et al: "Learning Fine-Grained Image Similarity with Deep Ranking". 2014 IEEE Conference on Computer Vision and Pattern Recognition. Apr. 17, 2014 (Apr. 17, 2014). pp. 1386-1393. XP055263324.
Greg Mori et al: "Pose Embeddings: A Deep Architecture for Learning to Match Human Poses". Jul. 1, 2015 (Jul. 1, 2015). pp. 1-9. XP055376897. / Jul. 1, 2015.

* cited by examiner

METHOD AND SYSTEM FOR EFFICIENTLY MINING DATASET ESSENTIALS WITH BOOTSTRAPPING STRATEGY IN 6DOF POSE ESTIMATE OF 3D OBJECTS

PRIORITY

This application is a national phase filing under 35 U.S.C. § 371 of International Patent Application No. PCT/US2017/022035, filed Mar. 13, 2017, which claims the benefit of priority to U.S. Provisional Patent Application Ser. No. 62/307,883, filed Mar. 14, 2016, which are incorporated herein by reference in their entirety.

TECHNICAL FIELD

This application relates to processing large data sets using deep learning neural networks. More particularly, this application relates to complex applications using neural networks to estimate poses for objects in an image. For example, some systems designed for the identification of parts within an assembly based on 2.5 dimensional (2.5D) images captured of portions of the assembly.

In these applications, the dataset is extremely large due to six degrees of freedom (6DOF) including three degrees of translational motion and three dimensions of rotational motion. With respect to training a neural network to estimate a pose, the problem of measuring similarities across the two metric spaces (translation and rotation), cannot be solved by a binary classification/regression method.

To address this limitation, a triplet sampling strategy may be used where a relative distance rather than a direct metric distance is measured. However, using triplets results in a dramatically increased training set size. For example, in a dataset containing M images, the total number of triplets approaches $M^3$. Although present techniques of deep learning can handle a dataset of this size, the training of the neural network in this case would take an infinite amount of time, while providing an output having less than desired accuracy. Accordingly, challenges that relate to the sampling of the pose space sampling of triplets present obstacles to the 6DOF pose estimation problem. Systems and methods that overcome these disadvantages are therefore desired.

BACKGROUND

In complex systems, maintenance is required where a part in an assembly must occasionally be repaired or replaced. Manufacturers of these systems or subsystems thereof may have a large number of spare parts. These parts may be identified through a part identifier, such as a part number. However, part identification while in the field may be difficult. In large systems, such as mobility solutions involving trains, when a problem arises, a field technician is dispatched to the location of the equipment. The field technician has specialized knowledge as to the operation of the train and identifies the part which needs repair or replacement. Once the part is identified in the field, the part must be ordered, using its part identifier, and a spare part must be located within the manufacturer's distribution system. Moreover, the parts inventory may contain similar parts, making identification of the correct part needed difficult.

Deep training of neural networks is an emerging technology that is attracting much attention. Deep learning networks are capable of learning characteristics of the object on which they act. However, the initial training of these networks is dependent on the relevance and quality of the initial training data. Further, the size of the databases used for training must be managed to a level which allows acceptable processing times.

Improved systems and methods are desired which address these challenges.

SUMMARY

According to aspects of embodiments described in this disclosure, a method for identifying a feature in a first image comprises establishing an initial database of image triplets, and in a pose estimation processor, training a deep learning neural network using the initial database of image triplets, calculating a pose for the first image using the deep learning neural network, comparing the calculated pose to a validation database populated with images data to identify an error case in the deep learning neural network, creating a new set of training data including a plurality of error cases identified in a plurality of input images and retraining the deep learning neural network using the new set of training data.

According to aspects of embodiments described in this disclosure, methods include iteratively retraining the deep learning neural network with a series of new training data sets.

According to aspects of embodiments described in this disclosure, methods further comprise conducting statistical analysis on a plurality of error cases to select a subset of the plurality of error cases to be included in the new set of training data.

According to aspects of embodiments described in this disclosure the statistical analysis includes identifying a cluster center of error cases located within a predetermined radius within an input image. Further statistical analysis may include identifying a degree of error in an error case and selecting a first error case having a larger degree of error than a second error case having a smaller degree of error than the first error case, and including the first error case in the new set of training data.

According to aspects of embodiments described in this disclosure, the statistical analysis comprises identifying a first error case having a greater number of neighbor regions of the image identified as error cases than a second error case having a fewer number of neighbor region of the image identified as error cases. Aspects of embodiments may include the validation database containing annotated images for a part assembly, the annotated images corresponding to the part assembly across three degrees of translation freedom and across three degrees of rotational freedom.

In aspects of an embodiment, each image triplet represents three images, a first image relative to a second image, which is closer to the first image and a third image which is farther from the first image than the second image.

In aspects of embodiments, identifying an error case comprises identifying an image triplet in which the deep learning neural network generates an output indicative of the third image being closer to the first image than the second image.

According to aspects of embodiments described in this disclosure, identifying a part within an assembly comprises capturing an image of the assembly by an image capture device, receiving the captured image in a deep learning neural network, in a pose estimation processor determining a pose of the assembly in the captured image based on processing of the received captured image in the deep learning neural network, and displaying to a user, at least one part identified in the image based on the determined pose of the assembly.

Aspects of embodiments of the disclosure include selecting by the user, one part of the at least one identified part associating a part identifier with the selected part.

Other aspects according to embodiments of this disclosure include communicating to a remote computer, the part identifier associated with the selected part, wherein the communication is operable to cause the remote computer to execute an order for a replacement part having the part identifier communicated to the remote computer.

According to aspects of embodiments of the present disclosure include a non-transitory computer readable medium on which are stored instructions that when executed by a pose estimation processor cause the pose estimation processor to establish an initial database of image triplets, train a deep learning neural network using the initial database of image triplets, calculate a pose for the first image using the deep learning neural network, compare the calculated pose to a validation database populated with images data to identify an error case in the deep learning neural network, create a new set of training data including a plurality of error cases identified in a plurality of input images and retrain the deep learning neural network using the new set of training data. In aspects of embodiments of the disclosure may further include instructions which when executed by the pose estimation processor, cause the pose estimation processor to iteratively retrain the deep learning neural network with a series of new training data sets.

According to aspects of embodiment of the disclosure, a non-transitory computer readable medium contains instructions which when executed by the pose estimation processor, cause the pose estimation processor to conduct statistical analysis on a plurality of error cases to select a subset of the plurality of error cases to be included in the new set of training data.

According to aspects of embodiment of the disclosure, a non-transitory computer readable medium contains instructions which when executed by the pose estimation processor, cause the pose estimation processor to identify a degree of error in an error case and selecting a first error case having a larger degree of error than a second error case having a smaller degree of error than the first error case, and including the first error case in the new set of training data.

According to aspects of embodiment of the disclosure, a non-transitory computer readable medium contains instructions which when executed by the pose estimation processor, cause the pose estimation processor to identify a first error case having a greater number of neighbor regions of the image identified as error cases than a second error case having a fewer number of neighbor region of the image identified as error cases.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Figure 1:
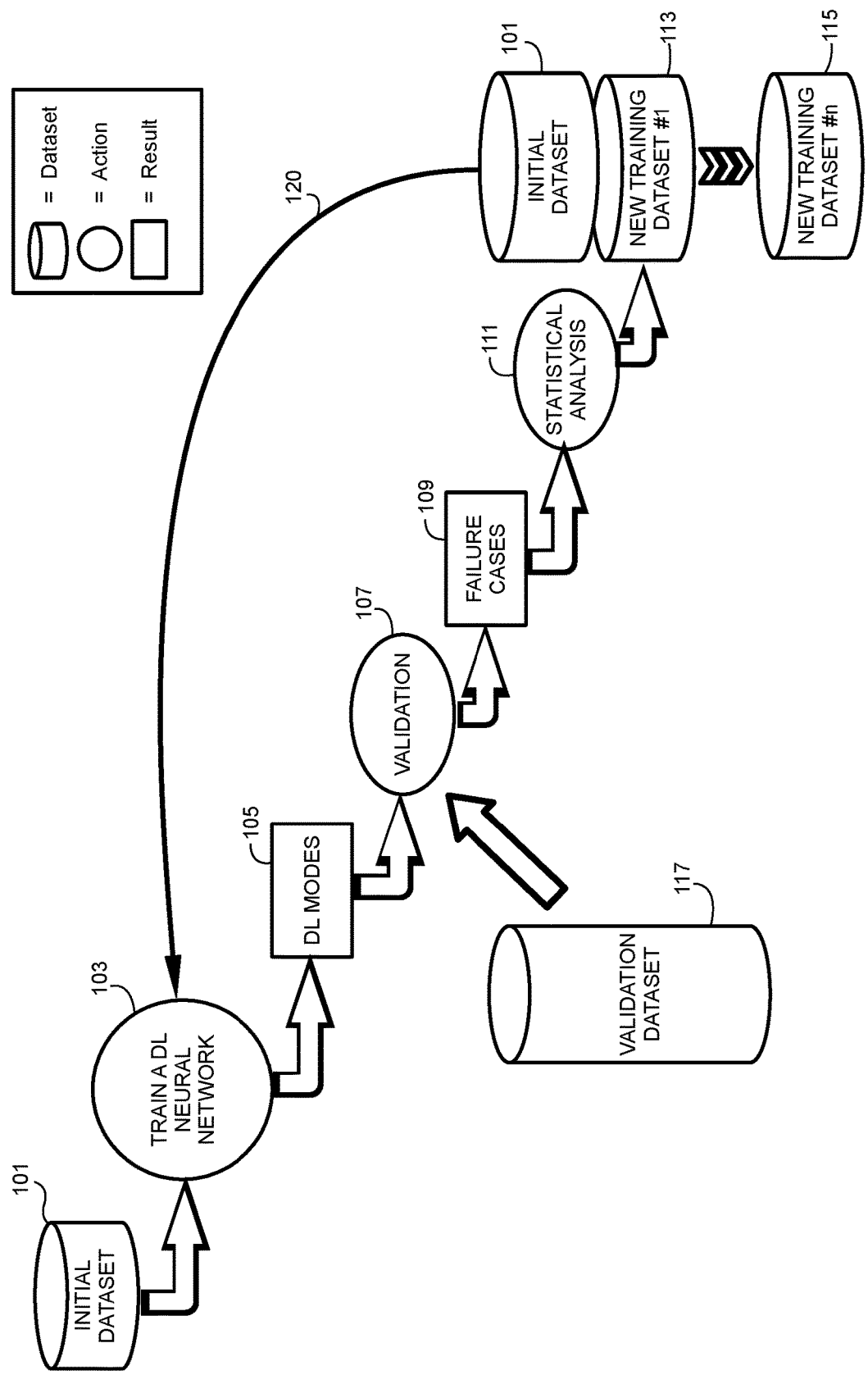
FIG. 1 is a diagram illustrating an iterative training process for a deep learning neural network according to aspects of an embodiment of this disclosure.

In this disclosure a system and method is presented that can significantly improve the efficiency of deep neural network training with an extremely large dataset. This allows for automatically identifying spare parts of any scale within an industry assembly. By way of non-limiting example, one industry assembly to which these methods may be applied is an assembly of a train, identifying specific parts from a single 2.5 dimensional image snapshot taken from a depth sensing device.

With a goal targeted at recognizing spare parts regardless of the object size, a traditional image classification based method cannot be directly applied to the recognition problem. To overcome this, a pose recognition problem of 3D objects is formulated which estimates the camera pose of the input image and maps it to the 3D computer aided drafting (CAD) model of the object. Once mapped, part identification can be transferred from the CAD to the input image.

Identifying the accurate pose of a 3D object presents a challenge. A common way to solve the pose estimation problem is querying the input image within a pre-collected large dataset, where the ground truth poses have been calculated. The image query returns with a list of nearest neighbors, which infer the actual pose of the input image. Therefore, the accuracy of the pose estimation algorithm is determined by the ability of the algorithm to find the actual nearest neighbors from a large dataset.

In the real world applications, the dataset is usually extremely large based on six degrees of freedom associated with the 3D object, including 3 dimensions of translation and another 3 dimensions of rotation. (e.g., the viewing direction). Because it is impracticable to put data from all poses in the dataset, a down-sampled discrete pose space is used to represent the entire linear space. Achieving a representative yet compact database for the query/indexing purposes is critical to solve the pose estimation problem.

Another roadblock to the pose estimation problem is organization of the training data. Since it is hard to directly measure similarities across two different metric spaces (e.g., translation and rotation), the problem cannot be solved by a conventional binary classification/regression method. For this reason, a triplet sampling strategy has been developed where a relative distance rather than a direct metric distance is measured.

Specifically, each sample x in a dataset will be given a sample $x^+$ and $x^-$ that are defined as a closer sample and farther sample, respectively. The goal is to learn a distance function f such that for any new triplet of the samples $(x,x^+,x^-)$ the triplet obeys the condition that $f(x,x^+)<f(x,x^-)$. The triplet sampling strategy is usually easier to apply in very large scale applications, but it dramatically increases the size of the training set. For example, considering a dataset containing M images, the total number of triplets may approach $M^3$. Although recent machine learning algorithms such as deep neural networks could handle such big dataset, it will take an infinite amount of time to complete the training. Notwithstanding this obstacle, the result might nevertheless be less useful than expected. Accordingly, mining the most useful triplet information is critical to the pose estimation problem.

As mentioned above, there are two major issues for solving the 6DOF pose estimation problem of a 3D object. First, the sampling of the pose space must be established. Secondly, the sampling of the triplets must be performed. In this disclosure a novel bootstrapping pipeline is implemented to solve the two problems together. In embodiments, error cases are identified between the query data processed by the neural network and a validation database. An error case is identified when the neural network determines that the triplet violates the condition $f(x,x^+) < f(x,x^-)$, meaning that the neural network determined that the closer sample in the triplet was thought to be the farther sample. In the iterative pipelined bootstrapping method according to embodiments of the disclosure, some or all of the identified error cases are used to construct a new set of training data. The new set of training data is input to the neural network to retrain or fine tune the neural network, thereby reducing the size of the training set.

FIG. 1 is an illustration of a bootstrapping pipeline according to aspects of the disclosure. The full pipeline utilizes an iterative approach and with regard to FIG. 1, datasets are denoted as cylinders, major nodules are denoted as circles and intermediate results are denoted by rectangles.

An initial dataset 101 is established and data in the initial dataset 101 is provided to a deep learning (DL) neural network 103. The deep learning modes 105 of the neural network are validated 107 using validation dataset 117. Samples from the initial database 110 that are determined to vary from the validation dataset are identified as failure cases 109. Statistical analysis 111 is performed on the validation data including the error cases to iteratively create a new training dataset 113, 115 which is provided as feedback 120 to the neural network 103 for further DL training. Thus, a list of training data sets are generated beginning with the initial dataset 101, continuing to new training dataset #1 113, and ending with a new training dataset # n 115, where n is the number of iterations performed.

To establish the training pipeline, two datasets need to be built. The first dataset will be the initial database 101, which stores images representing different camera poses. The pose sampling of the initial database 101 is not critical but may adopt one or more strategies, such as random or uniform sampling over the full 6DOF pose space, or simply implement a visibility check to select only poses achievable from feasible camera poses. The initial database 101 is configured to be sparse enough such that the initial database 101 only contains only small portions of the full pose space.

The second required is the validation dataset 117, which potentially covers the full pose space. The reason for this validation dataset is to evaluate the performance of the machine deep learning algorithm at the current bootstrapping iteration. According to embodiments, the machine learning algorithm is a deep neural network, an example of which is shown in FIG. 2.

Figure 2:
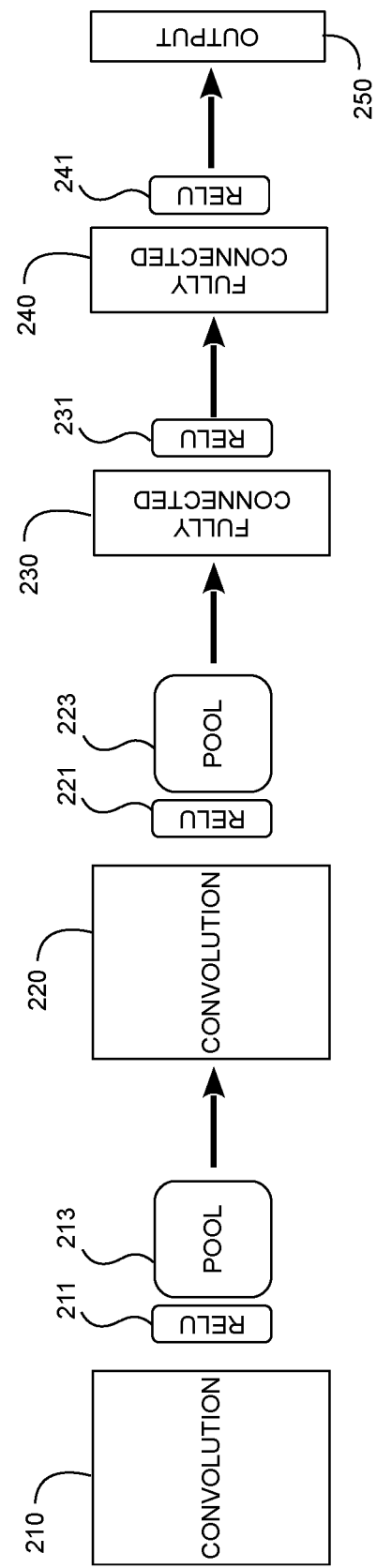
FIG. 2 is a block diagram of a deep neural network which may be used in aspects of embodiments described in this disclosure.

Referring to FIG. 2, an exemplary embodiment of a deep learning neural network, which may be used to implement aspects of this disclosure, is shown. The neural network includes a first convolutional layer 210 which includes a rectified linear unit layer (ReLu) 211 and pooling layer 212. A second convolutional layer 220, including ReLu layer 221 and pooling layer 222. The first and second convolutional layers 210, 220 provide their outputs to a first fully connected layer 230 having ReLu layer 231 and second fully connected layer 240 having ReLu layer 241. ReLu layers 211, 221, 231, and 241 and pooling layers 212, 222 increase the non-linearity properties of the decision function. The output of the second fully connected layer 240 results in an N-dimensional feature vector 250.

With reference again to FIG. 1, when the initial query database 101 is created, a small list of triplet samples may be generated, which are used to train the deep neural network 103. The neural network splits the input triplet samples and iteratively learns a mapping function to minimize a pre-defined loss function f. For example, minimizing the pre-defined loss function may be achieved using stochastic gradient descend or other similar methods. When the deep neural network is trained, the loss layer is removed and the network directly outputs a feature vector for each input datum. Therefore, for each datum in the validation dataset 117, an N-dimensional (N-D) feature vector is output by the neural network.

A search is performed to identify the nearest neighbors of the input data within the initial database. The pose differences in the images are determined by comparing the queried nearest neighbors to the ground truth contained in the validation data. Accordingly, this process is referred to as validation. If the pose difference is greater than a pre-defined threshold, the input image from the validation dataset and its queried neighbors will be treated as an error case and labeled as x and $x^-$, respectively. The method then selects a random sample $x^+$ from the initial database to form a new triplet sample. Stated differently, the two samples should be recognized as being far away from each other according to ground truth, however the neural network incorrectly recognized them as a close pair (e.g. $x^+$). Therefore, this identified error case is useful for learning and is populated into the next iteration of training dataset.

Since only a small portion of the triplet samples are chosen, the neural network will likely overfit the training dataset at early iterations. In these cases, the training error is close to zero but the validation error is still large. Therefore, the neural network is retrained during these first iterations. Once the validation performance reaches some threshold, only fine tuning of the network is performed instead of training anew. This procedure significantly reduces the overall training period of the pipeline and still guarantees an early convergence.

After the validation step 107, the system captures a pool of error cases. One simple strategy involves starting the next iteration adding all the failure cases to the current training dataset and forming a new training dataset for the next iteration or round of training. Because the error cases at the beginning usually outnumber the initial database, adding all error cases generates a bias in the opposite direction. This reverse bias causes the training step to oscillate between two directions and resists convergence. For this reason, during the first few iterations of the bootstrapping process, a statistical analysis 111 of the failure cases is performed and only representative failure cases are added to the next iteration. Examples of representative error case which may be used may be characterized as follows:

Cluster center of error cases located within a certain radius;
Relatively larger errors compared to others; and
Possessing more error neighbors than others.

After the statistical analysis step 111 and adding the error cases to the new training dataset 113, 115, the algorithm will initialize the next round of bootstrapping 120. The full procedure runs over several iterations until the performance of the validation dataset 117 reaches the output target.

Figure 3:
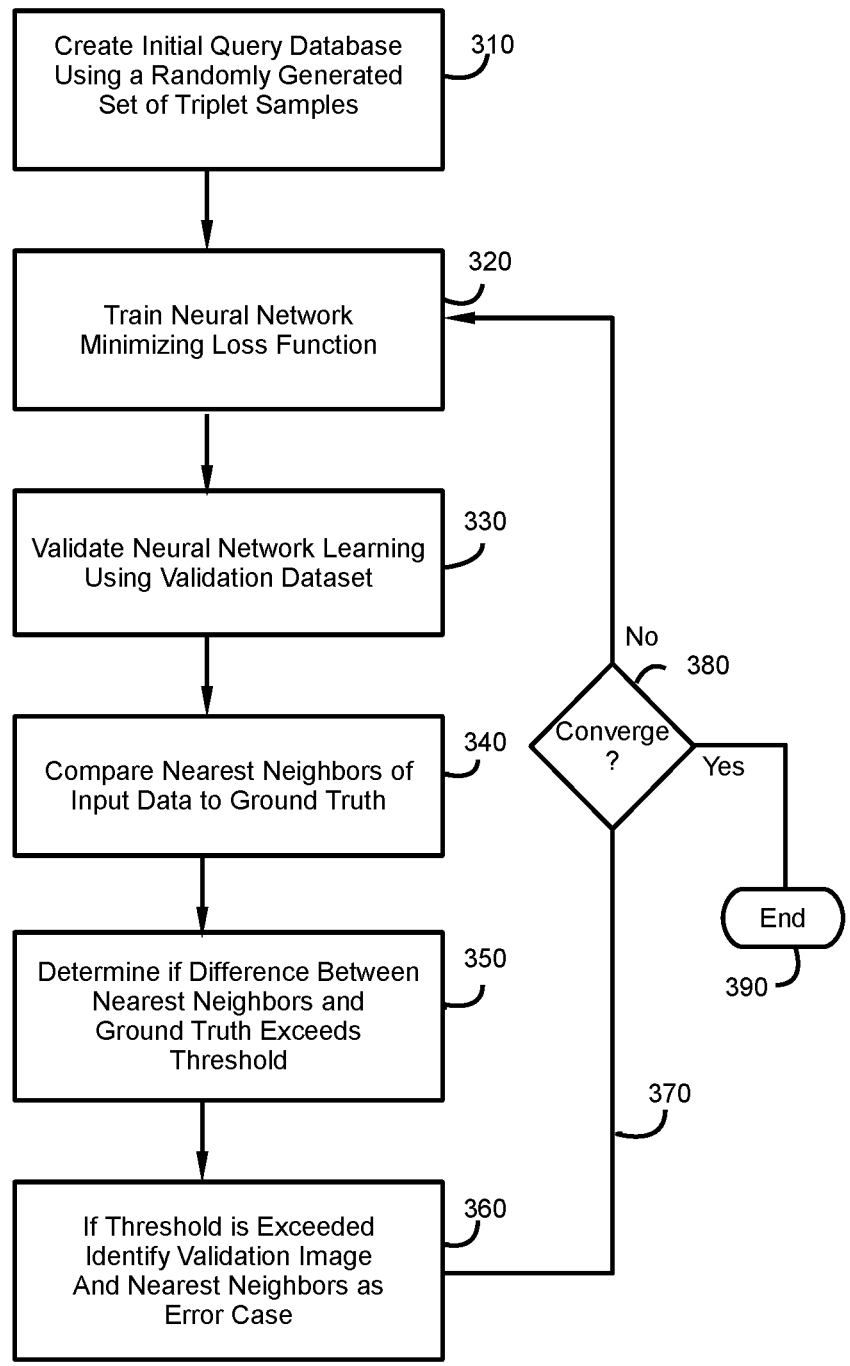
FIG. 3 is a process flow diagram for training a deep neural network according to aspects of an embodiment of this disclosure.

Referring to FIG. 3, a process flow for a method of training a deep learning neural network for 6DOF feature recognition according to aspects of disclosed embodiments is shown. At step 310 an initial query database is created. The initial database may include a randomly generated set of triplet samples. The set of triplet samples are used to train the deep learning neural network. The neural network is trained by minimizing a pre-defined loss function f at step 320. The training quality of the neural network is validated against the validation dataset 330. Validation includes comparing selected nearest neighbors of the input data to ground truth values in the validation dataset 340. The difference as identified by the comparison is then compared to a threshold difference 250. If the difference determined by the comparison exceeds the threshold value, the validation data and the input data along with its nearest neighbors are identified as an error case used for future training of the database 370. The resulting error cases from the comparison 340 are examined to determine if convergence has occurred 380. If the error cases have not converged, the error cases are input to the deep learning neural network to perform another iteration of training the neural network 320. If convergence has occurred, the training process is stopped and the training process ends 390.

Figure 4:
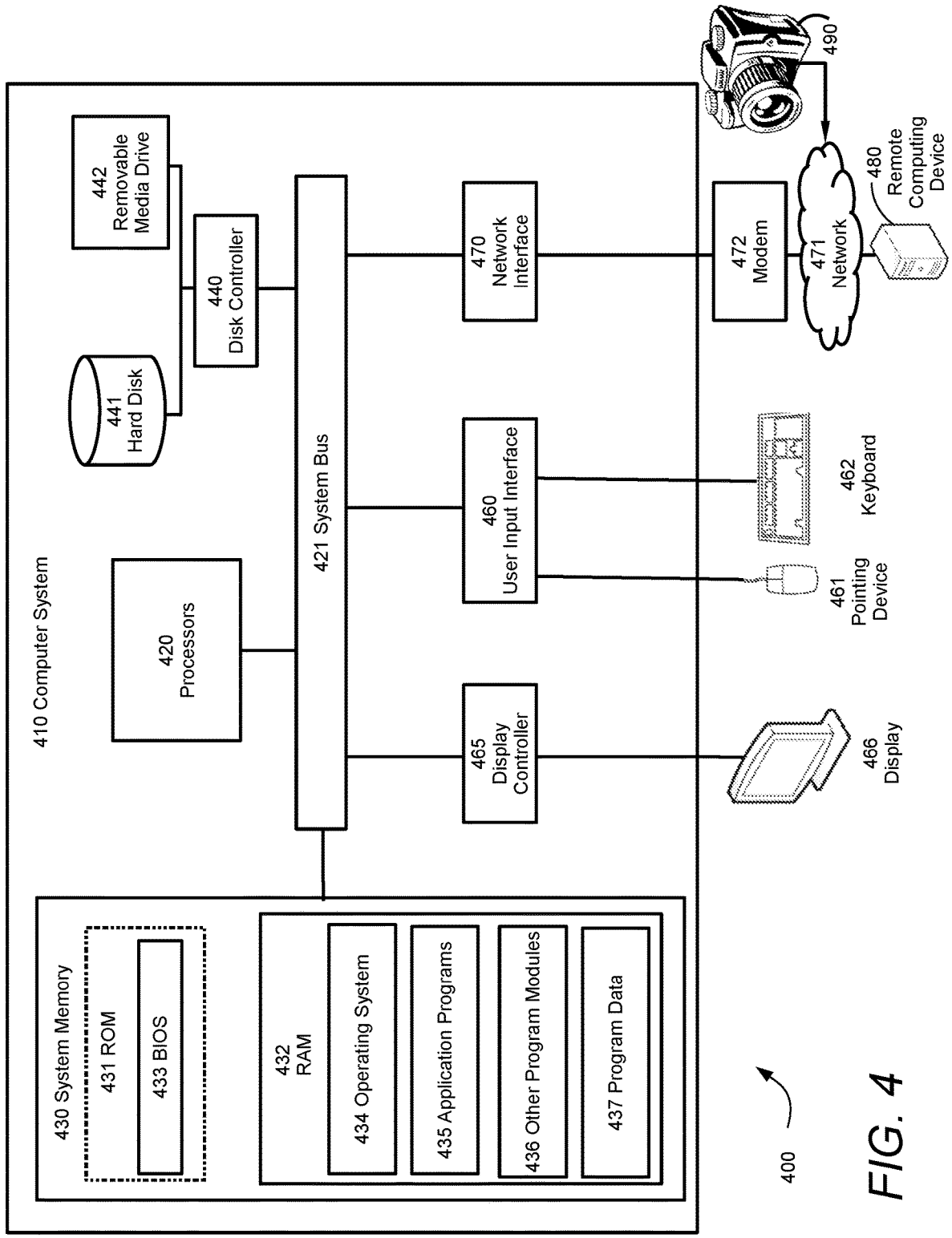
FIG. 4 is a block diagram of a computer system and image capture device for a pose estimation system according to aspects of embodiments of the present disclosure.

FIG. 4 illustrates an exemplary computing environment 400 within which embodiments of the invention may be implemented. Computers and computing environments, such as computer system 410 and computing environment 400, are known to those of skill in the art and thus are described briefly here.

As shown in FIG. 4, the computer system 410 may include a communication mechanism such as a system bus 421 or other communication mechanism for communicating information within the computer system 410. The computer system 410 further includes one or more processors 420 coupled with the system bus 421 for processing the information.

The processors 420 may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Continuing with reference to FIG. 4, the computer system 410 also includes a system memory 430 coupled to the system bus 421 for storing information and instructions to be executed by processors 420. The system memory 430 may include computer readable storage media in the form of volatile and/or nonvolatile memory, such as read only memory (ROM) 431 and/or random access memory (RAM) 432. The RAM 432 may include other dynamic storage device(s) (e.g., dynamic RAM, static RAM, and synchronous DRAM). The ROM 431 may include other static storage device(s) (e.g., programmable ROM, erasable PROM, and electrically erasable PROM). In addition, the system memory 430 may be used for storing temporary variables or other intermediate information during the execution of instructions by the processors 420. A basic input/output system 433 (BIOS) containing the basic routines that help to transfer information between elements within computer system 410, such as during start-up, may be stored in the ROM 431. RAM 432 may contain data and/or program modules that are immediately accessible to and/or presently being operated on by the processors 420. System memory 430 may additionally include, for example, operating system 434, application programs 435, other program modules 436 and program data 437.

The computer system 410 also includes a disk controller 440 coupled to the system bus 421 to control one or more storage devices for storing information and instructions, such as a magnetic hard disk 441 and a removable media drive 442 (e.g., floppy disk drive, compact disc drive, tape drive, and/or solid state drive). Storage devices may be added to the computer system 410 using an appropriate device interface (e.g., a small computer system interface (SCSI), integrated device electronics (IDE), Universal Serial Bus (USB), or FireWire).

The computer system 410 may also include a display controller 465 coupled to the system bus 421 to control a display or monitor 466, such as a cathode ray tube (CRT) or liquid crystal display (LCD), for displaying information to a computer user. The computer system includes an input interface 460 and one or more input devices, such as a keyboard 462 and a pointing device 461, for interacting with a computer user and providing information to the processors 420. The pointing device 461, for example, may be a mouse, a light pen, a trackball, or a pointing stick for communicating direction information and command selections to the processors 420 and for controlling cursor movement on the display 466. The display 466 may provide a touch screen interface which allows input to supplement or replace the communication of direction information and command selections by the pointing device 461.

The computer system 410 may perform a portion or all of the processing steps of embodiments of the invention in response to the processors 420 executing one or more sequences of one or more instructions contained in a memory, such as the system memory 430. Such instructions may be read into the system memory 430 from another computer readable medium, such as a magnetic hard disk 441 or a removable media drive 442. The magnetic hard disk 441 may contain one or more datastores and data files used by embodiments of the present invention. Datastore contents and data files may be encrypted to improve security. The processors 420 may also be employed in a multi-processing arrangement to execute the one or more sequences of instructions contained in system memory 430. In alternative embodiments, hard-wired circuitry may be used in place of or in combination with software instructions. Thus, embodiments are not limited to any specific combination of hardware circuitry and software.

As stated above, the computer system 410 may include at least one computer readable medium or memory for holding instructions programmed according to embodiments of the invention and for containing data structures, tables, records, or other data described herein. The term "computer readable medium" as used herein refers to any medium that participates in providing instructions to the processors 420 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 441 or removable media drive 442. Non-limiting examples of volatile media include dynamic memory, such as system memory 430. Non-limiting examples of transmission media include coaxial cables, copper wire, and fiber optics, including the wires that make up the system bus 421. Transmission media may also take the form of acoustic or light waves, such as those generated during radio wave and infrared data communications.

The computing environment 400 may further include the computer system 410 operating in a networked environment using logical connections to one or more remote computers, such as remote computing device 480. Remote computing device 480 may be a personal computer (laptop or desktop), a mobile device, a server, a router, a network PC, a peer device or other common network node, and typically includes many or all of the elements described above relative to computer system 410. When used in a networking environment, computer system 410 may include modem 472 for establishing communications over a network 471, such as the Internet. Modem 472 may be connected to system bus 421 via user network interface 470, or via another appropriate mechanism. Aspects of embodiments of this closure include image capture device 490 in communication with network 471. Images captured by the image capture device 490 are communicated to computer system 410 for processing. Images may be embodiments as digital files in which picture elements (pixels) contain data relating to objects captured in the image. The pixel data may be process in computer system 410 to perform feature recognition in the images according to aspects of methods described herein.

Network 471 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 410 and other computers (e.g., remote computing device 780). The network 471 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 471.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

What is claimed is:

1. A method for identifying a feature in a first image comprising:
    establishing an initial database of image triplets;
    in a pose estimation processor, training a deep learning neural network using the initial database of image triplets;
    calculating a pose for the first image using the deep learning neural network;
    comparing the calculated pose to a validation database populated with images data to identify an error case in the deep learning neural network;
    creating a new set of training data including a plurality of error cases identified in a plurality of input images;
    conducting statistical analysis on a plurality of error cases to select a subset of the plurality of error cases to be included in the new set of training data; and
    retraining the deep learning neural network using the new set of training data.

2. The method of claim 1, further comprising:
    iteratively retraining the deep learning neural network with a series of new training data sets.

3. The method of claim 1, wherein the statistical analysis comprises identifying a cluster center of error cases located within a predetermined radius within an input image.

4. The method of claim 1, wherein the statistical analysis comprises identifying a degree of error in an error case and selecting a first error case having a larger degree of error than a second error case having a smaller degree of error than the first error case, and including the first error case in the new set of training data.

5. The method of claim 1, wherein the statistical analysis comprises identifying a first error case having a greater number of neighbor regions of the image identified as error cases than a second error case having a fewer number of neighbor region of the image identified as error cases.

6. The method of claim 1, wherein the validation database contains annotated images for a part assembly, the annotated images corresponding to the part assembly across three degrees of translation freedom and across three degrees of rotational freedom.

7. The method of claim 1, wherein each image triplet represents three images, a first image relative to a second image, which is closer to the first image and a third image which is farther from the first image than the second image.

8. The method of claim 7, wherein identifying an error case comprises identifying an image triplet in which the deep learning neural network generates an output indicative of the third image being closer to the first image than the second image.

9. A method of identifying a part within an assembly comprising:
    capturing an image of the assembly by an image capture device;
    receiving the captured image in a deep learning neural network;
    in a pose estimation processor, determining a pose of the assembly in the captured image based on processing of the received captured image in the deep learning neural network;
    displaying to a user, at least one part identified in the image based on the determined pose of the assembly,
    wherein the deep learning neural network is trained according to a method comprising:
        establishing an initial database of image triplets;
        in a pose estimation processor, training a deep learning neural network using the initial database of image triplets;
        calculating a pose for the first image using the deep learning neural network;
        comparing the calculated pose to a validation database populated with images data to identify an error case in the deep learning neural network;
        creating a new set of training data including a plurality of error cases identified in a plurality of input images;
        conducting statistical analysis on a plurality of error cases to select a subset of the plurality of error cases to be included in the new set of training data; and
        retraining the deep learning neural network using the new set of training data.

10. The method of claim 9, further comprising:
    selecting by the user, one part of the at least one identified part;
    associating a part identifier with the selected part.

11. The method of claim 10, further comprising:
    communicating to a remote computer, the part identifier associated with the selected part, wherein the communication is operable to cause the remote computer to execute an order for a replacement part having the part identifier communicated to the remote computer.

12. The method of claim 9, further comprising:
    iteratively retraining the deep learning neural network with a series of new training data sets.

13. A non-transitory computer readable medium on which are stored instructions that when executed by a pose estimation processor cause the pose estimation processor to:
    establish an initial database of image triplets;
    train a deep learning neural network using the initial database of image triplets;
    calculate a pose for the first image using the deep learning neural network;
    compare the calculated pose to a validation database populated with images data to identify an error case in the deep learning neural network;
    create a new set of training data including a plurality of error cases identified in a plurality of input images;
    conduct statistical analysis on a plurality of error cases to select a subset of the plurality of error cases to be included in the new set of training data; and
    retrain the deep learning neural network using the new set of training data.

14. The non-transitory computer readable medium of claim 13, further comprising:
    instructions which when executed by the pose estimation processor, cause the pose estimation processor to iteratively retrain the deep learning neural network with a series of new training data sets.

15. The non-transitory computer readable medium of claim 13, further comprising:
    instructions which when executed by the pose estimation processor, cause the pose estimation processor to identify a degree of error in an error case and selecting a first error case having a larger degree of error than a second error case having a smaller degree of error than the first error case, and including the first error case in the new set of training data.

16. The non-transitory computer readable medium of claim 13, further comprising:
    instructions which when executed by the pose estimation processor, cause the pose estimation processor to identify a first error case having a greater number of neighbor regions of the image identified as error cases than a second error case having a fewer number of neighbor region of the image identified as error cases.

* * * * *